(12) United States Patent
Feichtinger et al.

(10) Patent No.: US 9,242,564 B2
(45) Date of Patent: Jan. 26, 2016

(54) CONVERTER FOR AN ELECTRICAL MACHINE, CONTROLLER AND METHOD FOR OPERATING A CONVERTER

(75) Inventors: Thomas Feichtinger, Wiener Neustadt (AT); Wolfgang Paul, Maria Enzersdorf (AT); Christian Spindelberger, Gablitz (AT); Jürgen Tannheimer, Berndorf (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 326 days.

(21) Appl. No.: 13/546,031

(22) Filed: Jul. 11, 2012

(65) Prior Publication Data

US 2013/0015796 A1    Jan. 17, 2013

Related U.S. Application Data

(60) Provisional application No. 61/506,401, filed on Jul. 11, 2011.

(30) Foreign Application Priority Data

Jan. 17, 2012    (EP) .................................... 12151414

(51) Int. Cl.
*H02K 7/09* (2006.01)
*B60L 7/14* (2006.01)
(Continued)

(52) U.S. Cl.
CPC ... *B60L 7/14* (2013.01); *H02P 3/22* (2013.01); *H02P 29/024* (2013.01); *H02P 27/06* (2013.01); *Y02T 10/642* (2013.01)

(58) Field of Classification Search
USPC ............... 318/400.14, 400.17, 400.2, 400.26, 318/400.35, 400.09, 434, 400.22, 801, 803, 318/563, 400.21, 515, 599, 782, 590; 363/41, 56.03, 17, 56.02, 58, 98, 132, 363/136, 37, 38, 55, 56.01, 109, 131, 120
See application file for complete search history.

(56) References Cited

U.S. PATENT DOCUMENTS 5,347,443 A * 9/1994 Muramatsu et al. ............ 363/98
6,121,736 A * 9/2000 Narazaki et al. ......... 318/400.35
(Continued)

FOREIGN PATENT DOCUMENTS

| CN | 1115135 A | 1/1996 |
|---|---|---|
| CN | 1289470 A | 3/2001 |

(Continued)

OTHER PUBLICATIONS

Office Action and Search Report for Chinese Patent Application No. 2012103152914, dated Feb. 16, 2015, 6 pages. Includes 2 pages of English translation.

*Primary Examiner* — Shawki S Ismail
*Assistant Examiner* — Jorge L Carrasquillo
(74) *Attorney, Agent, or Firm* — Jordan IP Law, LLC; Todd A. Vaughn

(57) ABSTRACT

A converter for an electrical machine having a plurality of phase lines for connecting the electrical machine. For each phase line the converter has a half-bridge with a first semiconductor switch is configured to electrically connect at least one of the phase lines intermittently to a first supply line of the converter, and a second semiconductor switch configured to electrically connect the phase line intermittently to a second supply line of the converter. The converter is configured for operation in a first energy recovery limiting mode in which at least two of the first semiconductor switches are at least intermittently on simultaneously.

16 Claims, 6 Drawing Sheets

(51) Int. Cl.
*H02P 29/02* (2006.01)
*H02P 3/22* (2006.01)
*H02P 27/06* (2006.01)

(56) References Cited

U.S. PATENT DOCUMENTS

| | | | | |
|---|---|---|---|---|
| 6,153,993 | A * | 11/2000 | Oomura | H02P 6/12 318/434 |
| 6,710,564 | B2 * | 3/2004 | Shibuya | H02P 6/001 318/400.13 |
| 6,949,908 | B2 * | 9/2005 | Maslov | H02P 6/002 318/434 |
| 7,719,217 | B2 * | 5/2010 | Yokota | H02P 29/022 318/400.21 |
| 7,791,309 | B2 * | 9/2010 | Hwang | H02P 1/30 318/430 |
| 2005/0247656 | A1 * | 11/2005 | Sparenborg | B66C 13/48 212/276 |
| 2009/0096394 | A1 * | 4/2009 | Taniguchi | 318/400.09 |
| 2009/0195199 | A1 * | 8/2009 | Ito | 318/400.22 |
| 2010/0185350 | A1 * | 7/2010 | Okamura et al. | 701/22 |
| 2011/0310644 | A1 * | 12/2011 | Ogura | H02M 7/5387 363/55 |

FOREIGN PATENT DOCUMENTS

| | | |
|---|---|---|
| CN | 101652637 A | 2/2010 |
| CN | 101725423 A | 6/2010 |
| JP | 2006-320177 A | 11/2006 |

\* cited by examiner

CONVERTER FOR AN ELECTRICAL MACHINE, CONTROLLER AND METHOD FOR OPERATING A CONVERTER

CROSS-REFERENCE TO RELATED APPLICATIONS

The present application claims priority under 35 U.S.C. §119 to European Patent Application No. 12151414.5 (filed on Jan. 17, 2012), which claims priority to U.S. Provisional Patent Application No. 61/506,401 (filed on Jul. 11, 2011), which are each hereby incorporated by reference in their respective entireties.

FIELD OF THE INVENTION

The invention relates to a converter for an electrical machine, a method for operating a converter, and a controller for a converter. The converter has a plurality of phase lines for connecting the electrical machine. For each phase line the converter has a half-bridge with a first semiconductor switch and a second semiconductor switch. The first semiconductor switch is configured to electrically connect at least one of the phase lines intermittently to a first supply line of the converter, and the second semiconductor switch is configured to electrically connect the phase line intermittently to a second supply line of the converter. The first supply line may be a positive supply line of the converter which is configured to be connected to a positive pole of a voltage source; in that case, the second supply line is a negative supply line of the converter which is configured to be connected to a negative pole of a voltage source.

Alternatively, the first supply line may be a negative supply line of the converter which is configured to be connected to a negative pole of a voltage source; in that case, the second supply line is a positive supply line of the converter which is configured to be connected to a positive pole of a voltage source. The electrical machine may be an electric motor, an electric generator or a motor generator which, for the purpose of energy recovery, is also configured, inter alia, for converting mechanical energy into electrical energy. The number of phase lines may be a plurality, for example, 2, 3, 4 or 5, or another natural number greater than one. By way of example, the semiconductor switches may be thyristors or transistors, particularly IGBTs or power MOSFETs. Typically, each of the semiconductor switches has a freewheeling diode connected in parallel with it. One preferred development provides a normal mode of operation for the converter, in which desirable recovery (recuperation) of braking energy into the DC voltage source takes place.

BACKGROUND OF THE INVENTION

German Patent Publication DE 298 13 080 U1 describes an arrangement having a converter, a protective device and a permanently excited motor. The protective device is provided to prevent the converter from being destroyed as a result of intermediate-circuit capacitors being reformatted and as a result of blocking voltages on the converter valves being exceeded. The protective device is connected to the motor phases between the motor and the converter. The protective device includes a means for forming a signal which signals the presence of a harmful voltage reaction and a means for shorting a terminal voltage on the motor, with a forward resistance of the shorting means acting as a braking load.

The protective device may have the following application advantage, which is not mentioned therein: when the phases in an electrical synchronous machine (for example, a permanently excited electrical machine) are shorted together, the torque produced in the motor is high only at very low motor speeds. Above these very low motor speeds, the torque produced in the motor is substantially lower in event of a short than when the motor is operated with a nonreactive load.

Technical reasons will now first of all be provided for this behaviour by synchronous machines in order to facilitate comprehension of the implementability and principal of action of the present invention. The single nonreactive resistance which is still in the circuit when the phases are shorted is the nonreactive winding resistance. For the synchronous machine as a voltage source, the synchronous reactance of the machine is the internal resistance of this voltage source. Since the synchronous reactance of the electrical machine is proportional to the speed (See, K. Wippich, Electrical Machines and Drives II, Lecture at Oldenburg University of Applied Sciences, pg. 150), the voltage drop across the synchronous reactance outweighs the voltage drop across the nonreactive winding resistance to an ever greater degree as the speed increases. This mismatch between the internal resistance (the synchronous reactance) of the synchronous machine as a voltage source and the resistance of the load (the winding resistance) severely attenuates energy transfer from the drive shaft to the nonreactive resistance in the event of a short. In addition, the energy transfer between drive shaft and nonreactive resistance in the event of a short is diminished by virtue of the armature reaction being relatively large in the event of a short (Wippich loc. cit.).

SUMMARY OF THE INVENTION

The present invention uses the above-mentioned torque attenuation effects in the event of a short in the synchronous machine in order to diminish an undesirable, safety-critical torque (regeneration torque) which occurs in the event of undesirable energy recovery. Aside from the fact that diminishing torque is not the declared aim of the measure proposed in DE 298 13 080 U1 (shorting the phases together), the manufacturing outlay and the space requirement for the protective device which is proposed for this in DE 298 13 080 U1 are considerable.

An object of the invention is to prevent an undesirable, safety-critical torque by providing an arrangement having an appropriate protective action which is less expensive to manufacture than the known arrangement.

Furthermore, it is an object of the present invention to provide a method for operating a converter which allows less expensive manufacture of an arrangement having an appropriate protective action.

This object is achieved by a converter for an electrical machine, the converter having a plurality of phase lines for connecting the electrical machine. Each phase line of the converter has a half-bridge with a first semiconductor switch and a second semiconductor switch. The first semiconductor switch is configured to electrically connect at least one of the phase lines intermittently to a first supply line of the converter. The second semiconductor switch is configured to electrically connect the phase line intermittently to a second supply line of the converter. The converter is configured to operate intermittently in a first energy recovery limiting mode, in which at least two of the first semiconductor switches are at least intermittently on simultaneously, i.e., at the same time.

The object is also achieved by a controller for such a converter, the controller being configured to initiate the first or the second energy recovery limiting mode in the event of a malfunction in the converter.

The object is further achieved by a method for operating a converter that includes at least one of the following steps: providing a converter having a plurality of phase lines for connecting the electrical machine, each phase line the converter having a half-bridge with a first semiconductor switch and a second semiconductor switch, the first semiconductor switch being configured to electrically connect the phase line intermittently to a first supply line of the converter and the second semiconductor switch being configured to electrically connect the phase line intermittently to a second supply line of the converter; monitoring, using the converter, in order to recognize a malfunction in the converter; and then, when a malfunction in the converter has been recognized, operating the converter in a first energy recovery limiting mode in which at least two of the first semiconductor switches are at least intermittently on simultaneously.

In accordance with the invention, the converter is configured for intermittently in a first energy recovery limiting mode, in which at least two of the first semiconductor switches are at least intermittently on simultaneously, i.e., at the same time. This is advantageous in allowing the protective function to be integrated into the converter and additional manufacturing outlay and space requirement for the protective device to be saved. Preferably, in the first energy recovery limiting mode, all the first semiconductor switches are switched on and in this way all the phase lines are shorted together.

On account of the short, the synchronous reactance outweighs the nonreactive resistance at speeds which are not too low, the nonreactive resistance essentially having a series circuit containing the nonreactive winding resistance and the nonreactive resistance of the emitter/collector path or source/drain path of the semiconductor that is on. This mismatch, intentionally brought about by way of a short, between synchronous reactance and the nonreactive resistance, severely diminishes energy transfer between the drive shaft and the nonreactive resistances which remain in the circuit of the respective phase in the event of a short.

From the known relationship $M=P/2\pi f$, it follows that this diminishment of the energy transfer can also be used to achieve severe diminishment of the safety-jeopardizing torque change $dM/dt$ when the converter is taken out of operation (M:=torque; P:=energy transfer per unit time; f:=torque of the drive shaft).

The converter may be configured for operation at least intermittently in the first energy recovery limiting mode with the second semiconductor switches off. This is advantageous in allowing a short between the first and second supply lines to be prevented in the first energy recovery limiting mode.

The converter may be configured to be operated at least intermittently in a second energy recovery limiting mode, in which at least two of the second semiconductor switches are at least intermittently on simultaneously, i.e., at the same time. Preferably, in the second energy recovery limiting mode, all the second semiconductor switches are switched on and hence all the phase lines are shorted together. In order to prevent a short between the first and second supply lines, it may be advantageous to switch on the second semiconductor switches instead of switching on the first semiconductor switches when one of the second semiconductor switches has a short.

The converter may be configured for operation at least intermittently in the second energy recovery limiting mode with first semiconductor switches off. This is advantageous in allowing a short between the first and second supply lines to be prevented in the second energy recovery limiting mode.

The converter may be configured to adopt the first or the second energy recovery limiting mode when at least one controller for the converter is inactive, particularly when at least two controllers for the converter are inactive. This allows confident use of the converter, which diminishes an unwanted regeneration torque even when the controller of the converter is not at all or at least to some extent not fully functional (for example because a supply voltage for the controller has failed).

In accordance with the invention, the controller is configured to initiate the first or the second energy recovery limiting mode in the event of a malfunction in the converter. This is advantageous in allowing the regeneration torque to be diminished on the basis of a complex assessment of the operating state, the assessment being carried out by the converter controller.

The controller may be configured to initiate the first energy recovery limiting mode when one of the first semiconductor switches can no longer be switched off and/or the controller may be configured to initiate the second energy recovery limiting mode when one of the second semiconductor switches can no longer be switched off. This is advantageous in preventing a short between the two supply lines by selecting an energy recovery limiting mode which is suitable for the location of the semiconductor switch which can no longer be switched off.

The controller may be configured to initiate the first energy recovery limiting mode when one of the second semiconductor switches can no longer be switched on and/or the controller may be configured to initiate the second energy recovery limiting mode when one of the first semiconductor switches can no longer be switched on. This is advantageous in preventing a short between the two supply lines by selecting an energy recovery limiting mode which is suitable for the location of the semiconductor switch which can no longer be switched on.

The controller may be configured to activate the first energy recovery limiting mode on the basis of certain operating state parameters, such as at least one of speed, torque, frequency, temperature, power, power loss and/or another(s) state parameter. Alternatively or in combination, the controller may be configured to activate the second energy recovery limiting mode on the basis of certain operating state parameters, such as at least one of speed, torque, frequency, temperature, power, power loss and/or another(s) state parameter. This is advantageous in allowing the activation and possibly a selection of the energy recovery limiting mode to be matched to the operating state of the converter or of the overall system. Matching to an operating state may be expedient, by way of example, in order to prevent sudden torque changes, which may be difficult for a driver to handle or may be a traffic hazard for other road users. Independently of this, matching to an operating state may be expedient in order to prevent vehicle or system components from being overloaded. For matching to an operating state, it is possible to use information which is calculated directly by sensors or information which is derived or calculated in advance from data from one or more sensors.

The controller may be configured to activate the first energy recovery limiting mode on the basis of certain parameters produced in the converter and/or on the basis of external information supplied to the converter. Alternatively or in combination the controller may be configured to activate the second energy recovery limiting mode on the basis of certain parameters produced in the converter and/or on the basis of external information supplied to the converter.

Inclusion of data from sensors which are internal to the converter is a reliable way of achieving sufficient compatibility and availability of sensor data. Inclusion of external information which is supplied to the converter externally allows the energy recovery limiting mode to be activated or selected in a manner which is particularly predictive and/or has an improved application orientation.

The controller may be configured to activate the first and the second energy recovery limiting mode alternately. This allows better use to be made of a performance capability of the converter by virtue of the power loss in the semiconductor switches that are on being distributed over a greater number of semiconductor switches.

The controller may be configured to adjust a time for a time component of the activation of the first energy recovery limiting mode to a time component of the activation of the second energy recovery limiting mode, particularly to adjust it on the basis of a temperature distribution between the semiconductor switches and/or on the basis of a power distribution between the semiconductor switches. This measure can contribute to exhausting a performance capability of the converter (taking account of a safety margin) by virtue of the power loss being distributed in optimum fashion between the first and second semiconductor switches.

The controller may include a first controller element and a second controller element, the first controller element having a first plausibility checker which is configured to check outputs from the second controller element for plausibility and to initiate the first or the second energy recovery limiting mode when an implausibility is recognized. By transferring the converter to an energy recovery limiting mode as soon as the outputs from the second control element are recognized as implausible, it is possible to increase a probability of the converter changing to a safe mode of operation before the controller controls the converter erroneously.

The second control element may have a second plausibility checker which is configured to check outputs from the first controller element for plausibility and to initiate the first or the second energy recovery limiting mode when an implausibility is recognized. By transferring the converter to an energy recovery limiting mode as soon as the outputs from the first controller element are recognized as implausible, it is possible to increase still further a probability of the converter changing to a safe mode of operation before the controller controls the converter erroneously.

In accordance with the invention, the method for operating a converter includes at least one of the following steps: providing a converter having a plurality of phase lines for connecting the electrical machine, for each phase line the converter has a half-bridge with a first semiconductor switch and a second semiconductor switch, the first semiconductor switch being configured to electrically connect the phase line intermittently to a first supply line of the converter and the second semiconductor switch being configured to electrically connect the phase line intermittently to a second supply line of the converter; monitoring of the converter for recognizing a malfunction in the converter; and then, when a malfunction in the converter has been recognized, operating the converter in a first energy recovery limiting mode in which at least two of the first semiconductor switches are at least intermittently on simultaneously.

Such a method is advantageous insofar as it integrates a protective function for preventing an undesirable, safety-critical torque into the converter and saves additional manufacturing outlay and space requirement for the protective device.

BRIEF DESCRIPTION OF THE DRAWINGS

Advantageous refinements of the invention will emerge from the dependent claims. An exemplary embodiment of the invention will be discussed in principle below on the basis of the drawing, in which:

DETAILED DESCRIPTION OF EMBODIMENTS

Figure 1:
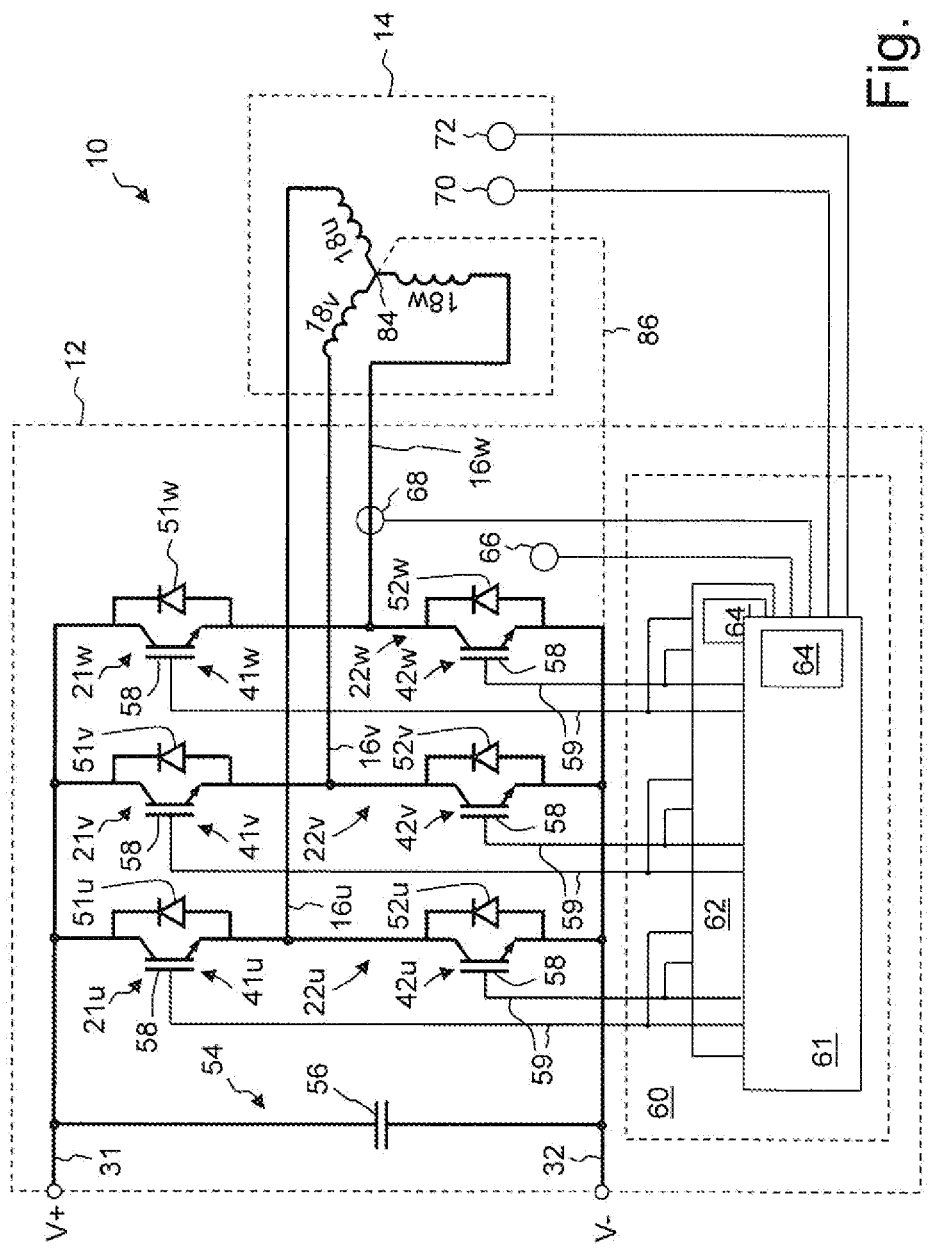
FIG. 1 illustrates a schematic block diagram of a converter with an electrical machine connected to the converter.

In the drawing figures, the same reference symbols are used for corresponding components in each case. Explanations relating to reference symbols therefore apply across the figures unless the context reveals anything different. For reasons of clarity, reference symbols which are denoted with a designation for the phase u, v, w are also used without a phase designation.

As illustrated in FIG. 1, the system 10 includes a converter 12 and an electric motor 14. The electric motor 14 is connected to the converter 12 by way of three phase lines 16u, 16v, 16w. The electric motor 14 is permanently excited. The permanent magnets (not illustrated) of the electric motor 14 are typically mounted in a rotor (not illustrated) of the electric motor 14, while the windings 18u, 18v, 18w of the electric motor 14 are arranged in a stator of the electric motor 14. FIG. 1 illustrates how the windings 18u, 18v, 18w are connected to corresponding phase lines 16u, 16v, 16w in a star connection or configuration. Alternatively, the windings 18u, 18v, 18w may be connected to corresponding phase lines 16u, 16v, 16w in a delta connection or configuration. For each phase line 16u, 16v, 16w, the converter 12 has a corresponding first circuit 21u, 21v, 21w for intermittently connecting the phase lines 16u, 16v, 16w to a supply line 31 at a positive voltage potential V+. Furthermore, for each phase line 16u, 16v, 16w, the converter 12 has a corresponding second circuit 22u, 22v, 22w for intermittently connecting the phase line 16u, 16v, 16w to a supply line 32 at a negative voltage potential V−.

Each first circuit 21 includes a first semiconductor switch 41u, 41v, 41w and a freewheeling diode 51u, 51v, 51w. Each second circuit 22 includes a second semiconductor switch 42u, 42v, 42w and a freewheeling diode 52u, 52v, 52w. The supply line 31 with the positive voltage potential V+ and the supply line 32 at the negative voltage potential V− may be part of an intermediate circuit 54 in the converter 12. To smooth voltage fluctuations, the intermediate circuit 54 may include an intermediate-circuit capacitance 56.

The semiconductor switches 41, 42 are typically thyristors, IGBTs or power MOSFETs. Furthermore, the semiconductor switches 41, 42 each include a freewheeling diode 51, 52 which is connected in antiparallel with a main current channel (collector/emitter path). of the semiconductor switch 41, 42. 'Antiparallel' means that the forward direction of the freewheeling diode 51, 52 in the parallel circuit has an opposite orientation to a main forward direction of the semiconductor switch 41, 42. When the semiconductor switch 41, 42 is a MOSFET, the freewheeling diode 51, 52 may, include just the body diode of the MOSFET 41, 42.

To reduce safety risks, one development provides for a controller 60 for the converter 12, the controller having a first control element 61 and a second 62 control element. Each gate 58 or each base connection of the first semiconductor switch 41 and the second 42 semiconductor switch is then connected by way of a control line 59 both to the first controller element 61 and the second controller element 62 of the converter 12. Each of the two controller elements 61, 62 includes a plausibility checker 64.

FIG. 1 further illustrates that the first control element 61 is connected to an internal temperature sensor 66 in order to obtain temperature information from an area of at least one of the semiconductor switches 41, 42. In addition, the first control element 61 is connected to an internal frequency sensor 68 in order to obtain frequency information from at least one of the phase lines 16. Furthermore, the first control element 61 is connected to an external temperature sensor 70 in order to obtain temperature information from an area of at least one of the windings 18 of the electric motor 14. Additionally, the first control element 61 is connected to an external speed sensor 72 in order to obtain speed information from the electric motor 14.

The second control element 62, although not illustrated, is connected to an internal temperature sensor in order to obtain temperature information from an area of at least one of the semiconductor switches 41, 42. In addition, the second control element 62 is connected to an internal frequency sensor in order to obtain frequency information from at least one of the phase lines 16. Furthermore, the second control element 62 is connected to an external temperature sensor in order to obtain temperature information from an area of at least one of the windings 18 of the electric motor 14. Additionally, the second control element 62 is connected to an external speed sensor 72 in order to obtain speed information from the electric motor 14.

Each first circuit 21 is arranged such that the current flows from the positive supply voltage connection 31 in a main forward direction of the first semiconductor switch 41 through the first semiconductor switch 41 to the phase line 16 and into the associated winding 18 of the electric motor 14 when the first semiconductor switch 41 is on. The second circuits 22 are arranged such that the current flows from a winding 18 of the electric motor 14 through the associated phase line 16 and then in the forward direction of the second semiconductor switch 22 through the second semiconductor switch 22 when the second semiconductor switch 22 is on. Delays (not illustrated) between times (during which the first semiconductor switch 41 is on) and directly adjacent times (during which the second semiconductor switch 42 for the same phase line is on) are used (at least in normal operation) to ensure that at no time are both semiconductor switches 41, 42 for the same phase line 16 on simultaneously.

If, on account of a fault in the converter 12 or on account of a malfunction, the converter 12 is taken out of operation while the rotor (not illustrated) of the electric motor 14 is rotating, the electric motor 14 acts as an electric generator. In this case, a rotating magnetic field (rotary field) induces a voltage (electromotive force) in the windings 18 of the electric motor 14. The rotary field is produced in the electric motor 14 by permanent magnets (which rotate concomitantly with the rotor). If all the first 41 and second 42 semiconductor switches are off on account of the converter 12 having been taken out of operation, only the freewheeling diodes 51, 52 are now on in their main forward direction.

The orientation of the freewheeling diodes means that although this does not result in a polarity reversal at the power supply end or on the intermediate circuit 54, it may result in the following other difficulties. Firstly, the rotary field can (for example, during rapid descent) induce a voltage in the windings 18$u$, 18$v$, 18$w$ which is higher than a dielectric strength of the intermediate-circuit capacitance 56. Secondly, the charging of the intermediate-circuit capacitance 56 (to the limit of its dielectric strength) with electrical energy implies the development of a torque which corresponds to the flow of energy (braking power by means of energy recovery) divided by the speed f. When a converter 12 which has an electric motor 14 connected to it which is driven by a rotating drive axle in a vehicle is taken out of operation in this way, a sudden change in the torque can result in alteration of a thrust in the vehicle too quickly too sharply and hence in a manner which is a hazard to traffic.

Figure 2:
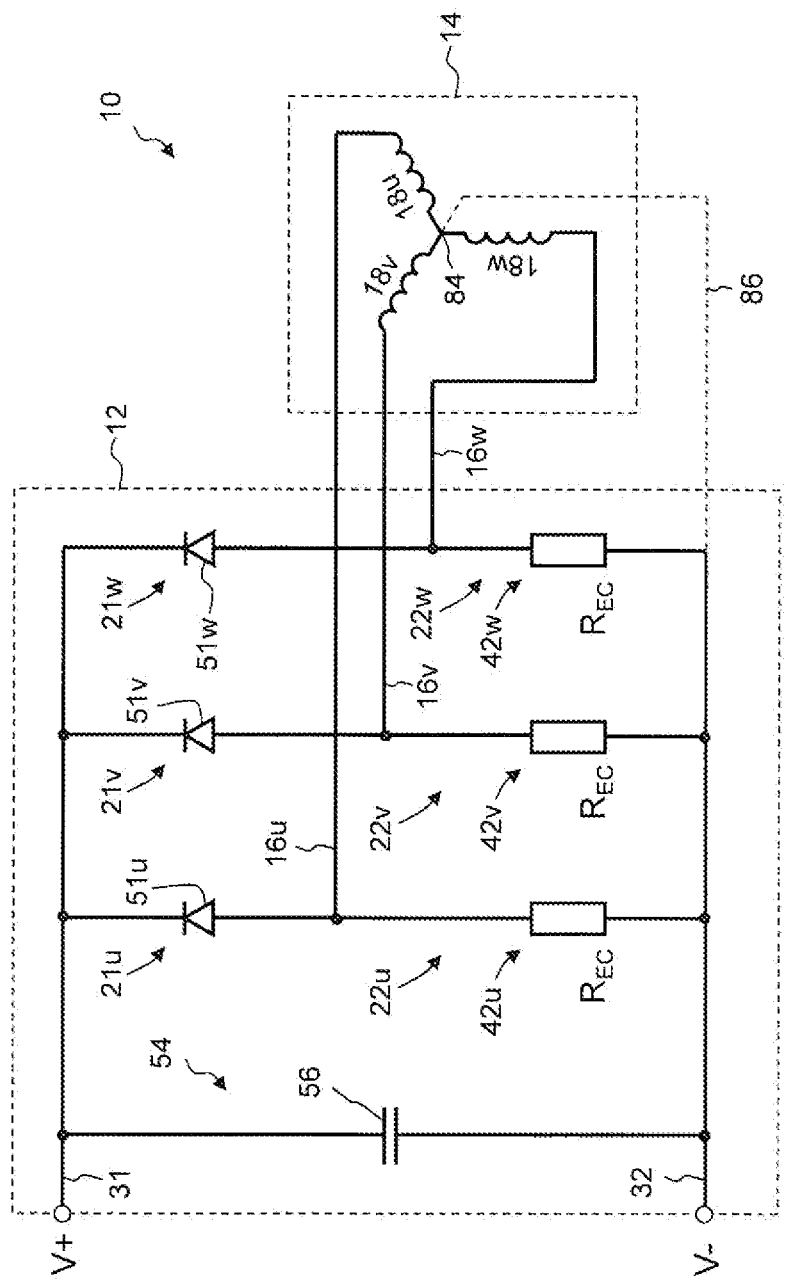
FIG. 2 illustrates a schematic equivalent circuit diagram for the converter in a first energy recovery limiting mode in the event of an interruption in the positive branch of the third half-bridge.

As illustrated in FIG. 2, an equivalent circuit diagram is provided for the converter 12 with a connected electric motor 14, which corresponds to a first energy recovery limiting mode EBM1, which the controller 60 sets in the event of an interruption in the positive branch 21$w$ of the third half-bridge 21$w$, 22$w$. In this case, aside from the faulty semiconductor switch 41$w$, all the other first semiconductor switches 41$u$, 41$v$ are off and all the second semiconductor switches 42 are on. The second semiconductor switches 42 then have a low forward resistance $R_{EC}$. To simplify matters, it is assumed in the equivalent circuit diagram that in this operating state the presence of the freewheeling diodes 52 (which are connected in antiparallel with the second semiconductor switches 42) is negligible in a first approximation. Assuming that the arrangement is rotationally symmetrical (radially symmetrical) (in relation to the rotary field), the equivalent circuit diagram is tantamount to an equivalent circuit diagram in which the star point 84 of the electrical machine 14 is at the same voltage potential as the negative supply line 31. A reminder of this circumstance is provided by the dashed line 86 in FIG. 2.

Figure 3:
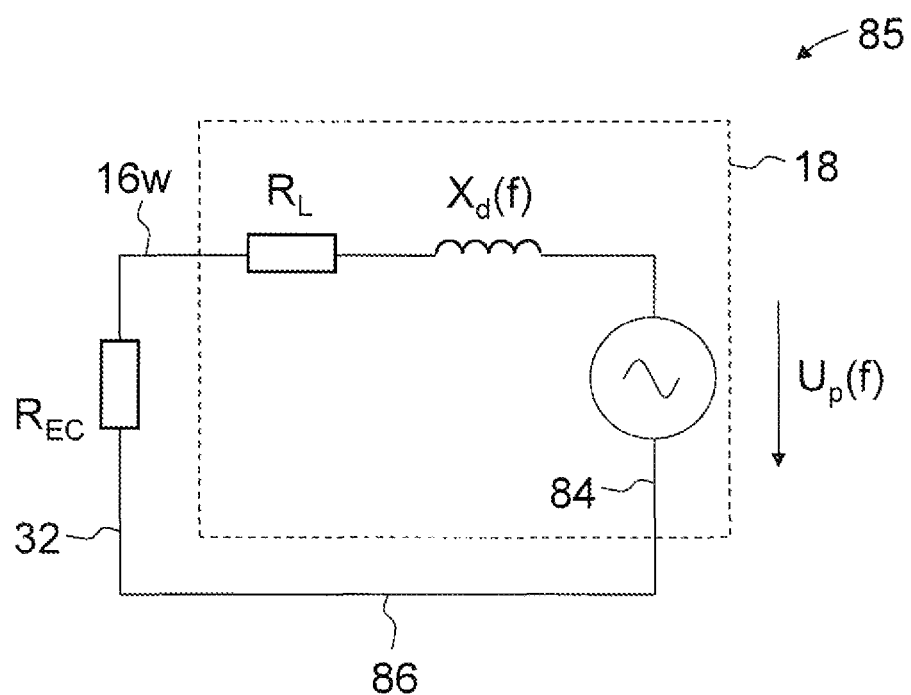
FIG. 3 illustrates a schematic equivalent circuit diagram of a circuit for a phase in the electrical machine for the phase and for an energy recovery limiting mode.

As illustrated in FIG. 3, an equivalent circuit diagram is provided of the circuit 85 for a phase u, v or w in the first energy recovery limiting mode EBM1. The circuit 85 includes a voltage source $U_p(f)$, a synchronous reactance $X_d(f)$, a nonreactive winding resistance $R_L$ and a forward resistance $R_{EC}$ of the semiconductor switch 41, 42. The voltage source $U_p(f)$ has an idle voltage, the AC voltage $U_p(f)$ of which corresponds to the electromotive force (EMF) of the winding 18$u$, 18$v$, 18$w$. As established at the outset, the synchronous reactance $X_d(f)$ of the electrical machine 14 is approximately proportional to the speed f over a wide speed range. So long as the speed f is not very low, the torque $M_R$ (regeneration torque) which appears in this first energy recovery limiting mode EBM2 of the converter 12 is, for reasons presented at the outset, substantially lower and hence substantially less critical to safety than if all the still functional semiconductor switches 41$u$, 41$v$, 42 were off.

In order to attain adequate attenuation of the torque $M_R$, an assumption in this context is that the sum of the nonreactive resistance $R_{EC}$ and the winding resistance $R_L$ is substantially less than the synchronous reactance $X_d(f)$. Preferably, a ratio $r=X_d(f)/(R_L+R_{EC})$ between the synchronous reactance $X_d(f)$ and the sum of the nonreactive resistance $R_{EC}$ and the winding resistance $R_L$ in the first EBM1 and/or in the second EBM2 energy recovery limiting mode is at least 5, particularly preferably at least 10 or 20, and quite particularly preferably at least 50 or 100. The same considerations apply to the second energy recovery limiting mode EBM2. In the equivalent circuit diagram, the notation (f) is a reminder of the fact that both the synchronous reactance $X_d(f)$ and the electromotive force $U_p(f)$ are speed-dependent.

Figure 4:
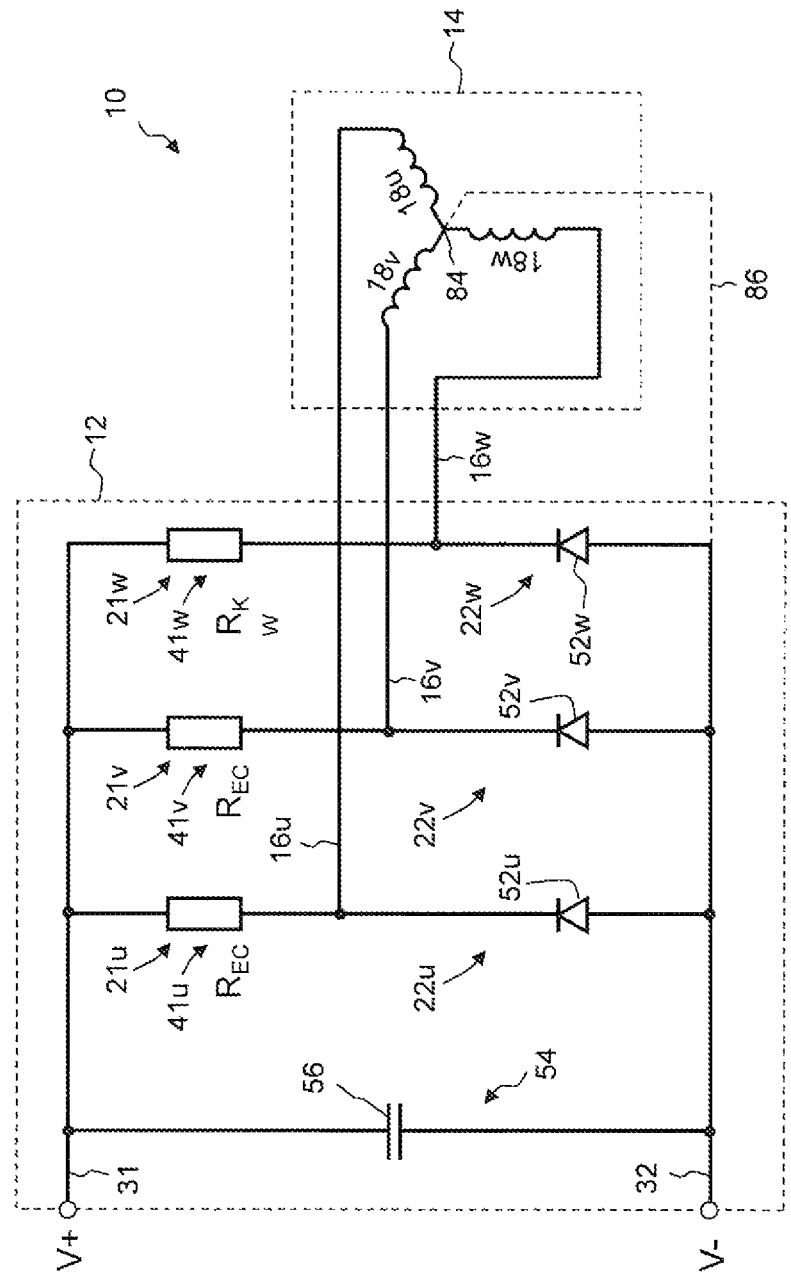
FIG. 4 illustrates a schematic equivalent circuit diagram for the converter during a second energy recovery limiting mode in the event of a short in the positive branch of the third semiconductor bridge.

As illustrated in FIG. 4, an equivalent circuit diagram is provided for the converter 12 with a connected electric motor 14, which corresponds to a second energy recovery limiting mode EBM2, which the controller 60 sets in the event of a short in the positive branch 21w of the third half-bridge 21w, 22w. In this case, aside from the faulty first semiconductor switch 41w, which is on, all the other first semiconductor switches 41u, 41v are on and all the second semiconductor switches 42 are off. The first semiconductor switches 41 have a low forward resistance $R_{EC}$ or $R_{KW}$. To simplify matters, it is assumed in the equivalent circuit diagram that in this operating state the presence of the freewheeling diodes 51 (which are connected in antiparallel with the first semiconductor switches 41) is negligible in a first approximation.

Assuming that the arrangement is rotationally symmetrical (radially symmetrical) (in relation to the rotary field), the equivalent circuit diagram is tantamount to an equivalent circuit diagram in which the star point 84 is at the same voltage potential as the negative supply line 32. A reminder of this circumstance is provided by the dashed line 86 in the figure. The equivalent circuit diagram of the circuit 85 for each phase u, v, w then essentially comprises a voltage source, the AC voltage $U_p$ of which corresponds to the electromotive force (EMF), and also the nonreactive winding resistance $R_L$ of the winding 18u, 18v, 18w for the phase u, v, w and a nonreactive resistance $R_{EC}$ which corresponds to the forward resistance of the semiconductor switch 41. So long as the speed f is not very low, the torque $M_R$ (regeneration torque) which appears in this first energy recovery limiting mode EBM1 of the converter 12 is substantially lower and hence substantially less critical to safety than if all the still functional semiconductor switches 41u, 41v, 42 are off.

Figure 5:
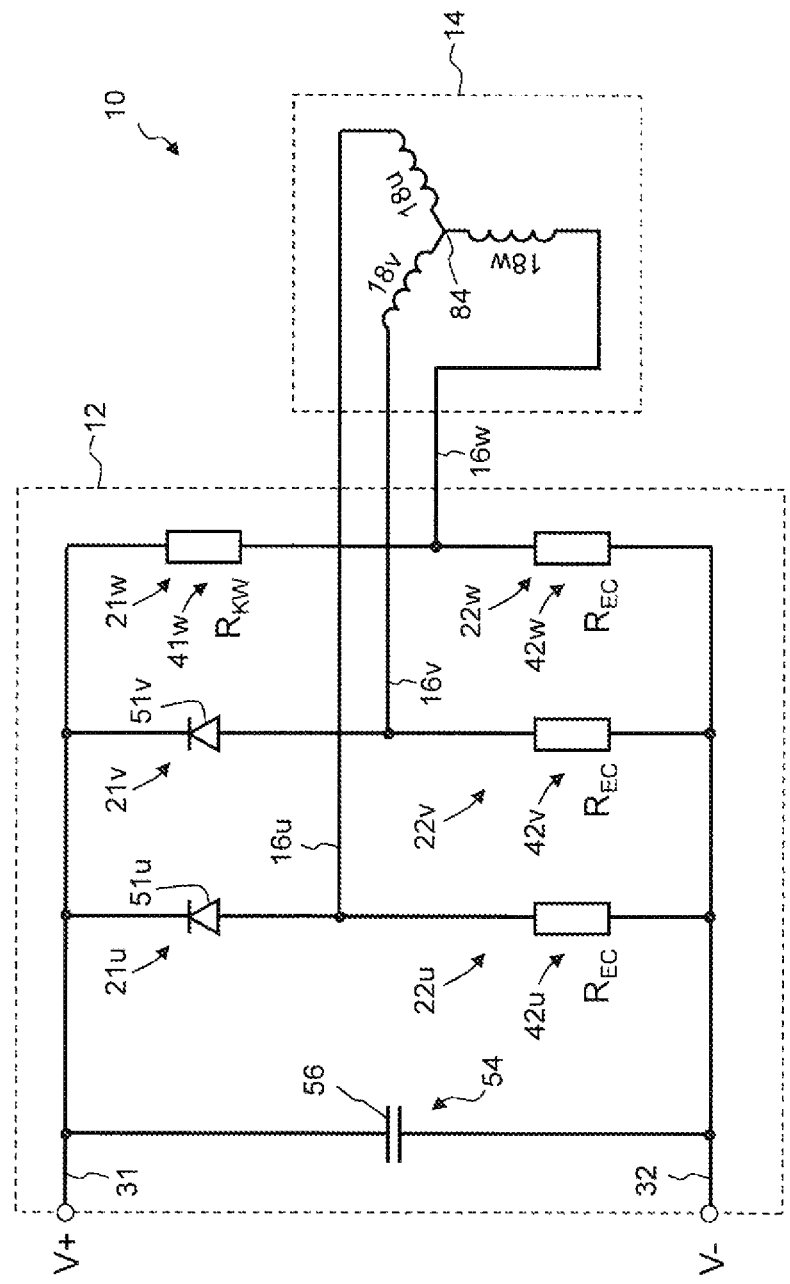
FIG. 5 illustrates a schematic equivalent circuit diagram for the converter in a first energy recovery limiting mode in the event of a short in the positive branch.

As illustrated in FIG. 5, an arrangement is provided in a second energy recovery limiting mode EBM2, which the controller 60 can optionally likewise (but not simultaneously/ at the same time as the first energy recovery limiting mode EBM1) set in the event of a short in the positive branch 21w of the third half-bridge 21w, 22w. In this case, apart from the faulty first semiconductor switch 41w, all the first semiconductor switches 41u, 41v are off and all the second semiconductor switches 42 are on. The second semiconductor switches 42 have a low forward resistance $R_{EC}$. To simplify matters, it is assumed in the equivalent circuit diagram that the presence of the freewheeling diodes 52 (which are connected in antiparallel with the second semiconductor switches 42) is negligible in this operating state in a first approximation. So long as the speed f is not very low, it is also true in this case that the torque $M_R$ (regeneration torque) which appears in this second energy recovery limiting mode EBM2 of the converter 12 is substantially lower and hence substantially less critical to safety than if all the still functional semiconductor switches 41u, 41v, 42 are off.

Figure 6:
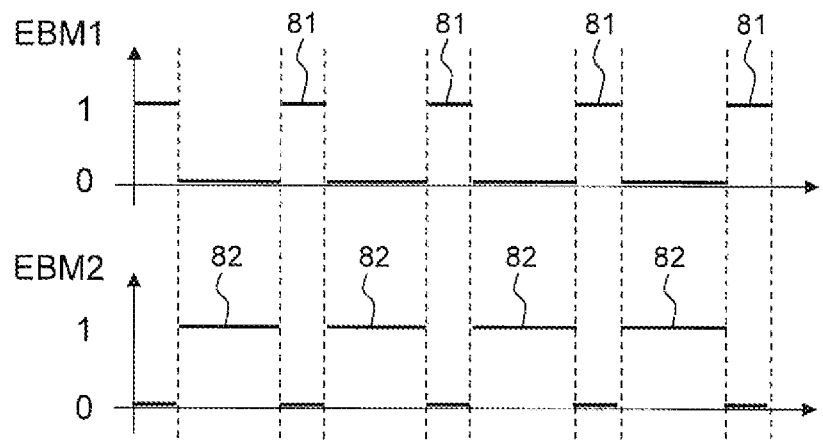
FIG. 6 illustrates a schematic timing diagram which shows how the first and second energy recovery limiting modes alternate for an embodiment of the converter.

As illustrated in FIG. 6 shows a schematic timing diagram is provided which shows, for an embodiment of the converter 12, how the first EBM1 and the second EBM2 energy recovery limiting mode alternate in time in the event of a short in the positive branch 21w of the third half-bridge 21w, 22w. In one development, the controller 60 can be used to adjust a time ratio 81/82 for a first time component 81 of the activation of the first energy recovery limiting mode EBM1 (i.e., time(s) during which the first semiconductor switch 41 is switched on) to a second time component 82 of the activation of the second energy recovery limiting mode EBM2 (i.e., time(s) during which the second semiconductor switch 42 is switched on). The time ratio 81/82 may be adjustable on the basis of a temperature distribution between the semiconductor switches 41, 42 and/or on the basis of a power distribution between the semiconductor switches 41, 42. Delays (not illustrated) between times 81 (during which the first semiconductor switch 41 is on) and directly adjacent times 82 (during which the second semiconductor switch 42 for the same phase line is on) are used to ensure (at least in normal operation) that at no time are both semiconductor switches 41, 42 for the same phase line 16 on simultaneously.

Alternatively or in combination with the design illustrated in FIG. 6, one development provides for the controller 60 to periodically deactivate and activate the first EBM1 and/or the second EBM2 energy recovery limiting mode in order to attain an average torque value in this way. This may be advantageous, for example, when a malfunction in the converter 12 occurs while the electric motor 14 is already in a regeneration mode on account of regenerative braking and it is necessary for a braking action (average torque) in the energy recovery limiting mode to be (as it were "seamlessly") matched to the torque of the last regenerative braking performed.

Figure 7:
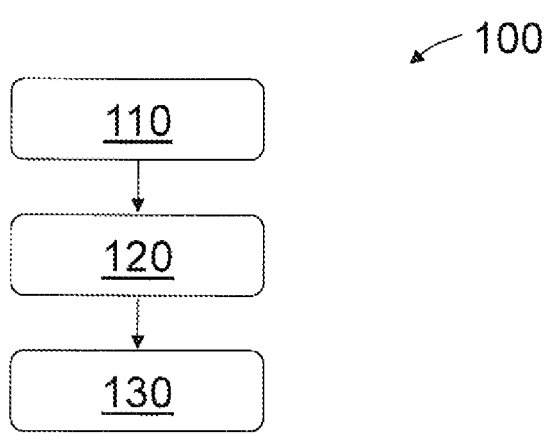
FIG. 7 illustrates a schematic flowchart in accordance with an embodiment of a method for operating a converter.

As illustrated in FIG. 7, a method 100 for operating a converter 12 is provided and includes at least one of the following steps 110, 120, 130. In a first step 110, a converter 12 in accordance with one of the embodiments described hereinabove is provided. In a second step 120, a function of the converter 12 for recognizing a malfunction in the converter 12 (for example, a plausibility checker 64) monitors whether there is a malfunction in the converter 12. In a third step 130, when a malfunction in the converter 12 has been recognized, the converter 12 is operated in a first energy recovery limiting mode EBM1, in which at least two 41u, 41v of the first semiconductor switches 41 are at least intermittently on at the same time. Preferably, all the phase lines 16 are shorted in this manner in the first energy recovery limiting mode EBM1.

In order to reduce safety risks in the event of failure of a component of the controller 60 or the power supply thereof, one development provides for the converters 12 to be configured to adopt the first EBM1 or the second EBM2 energy recovery limiting mode when at least one controller 60 for the converter 12 is inactive, particularly when at least two controllers 61, 62 for the converter 12 are inactive. This functionality of the converter 12 can be called "passive shorting of the phase lines 16."

The first controller element 61 may include a first plausibility checker 64, which is configured to check outputs from the second controller element 62 for plausibility and to initiate the first EBM1 or the second EBM2 energy recovery limiting mode when an implausibility is recognized. This functionality of the converter 12 can be called "active shorting of the phase lines 16." Furthermore, the second controller element 62 may include a second plausibility checker 64, which is configured to check outputs from the first controller element 61 for plausibility and to initiate the first EBM1 or the second EBM2 energy recovery limiting mode when an implausibility is recognized.

The same circuit principles can also be applied with reversed polarity. Analogue and/or digital electrical signals which are presented in the form of voltages in the exemplary embodiments can alternatively or additionally also be presented as (impressed) currents. Amplifiers or transformers can be used to rescale voltages or currents mentioned in the description on the way from their respective source to their respective sink. Analogue or digital signals which are presented in the form of voltages or currents may have linear or nonlinear coding on the basis of a known method or on the basis of a method which is not yet known today. Examples of coding methods which can be used are pulse width modulation and pulse code modulation. The analogue and/or digital signals can be transmitted electrically, optically or by radio. The analogue and/or digital signals can be transmitted using space-division multiplexing (that is to say using different lines), using time-division multiplexing or using code-division multiplexing. The analogue and digital signals can be transmitted by way of one or more bus systems.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

REFERENCE SYMBOLS

10 System
12 Converter
14 Electric motor; electrical machine
16 Phase line
18 Winding
21 First circuit
22 Second circuit
31 First supply line
32 Second supply line
41 First semiconductor switch
42 Second semiconductor switch
51 Freewheeling diode in the first circuit
52 Freewheeling diode in the second circuit
54 Intermediate circuit
56 Intermediate-circuit capacitance
58 Gate of the semiconductor switch
59 Control line
60 Controller
61 First controller element
62 Second controller element
64 Plausibility checker
66 Internal temperature sensor
68 Internal frequency sensor
70 External temperature sensor
72 External speed sensor
81 Times during which the first semiconductor switch 41 is switched on
82 Times during which the second semiconductor switch 42 is switched on
84 Star point
85 Equivalent circuit for a phase in the energy recovery limiting mode
86 Dashed line
100 Method for operating the converter
110 Provision of the converter
120 Monitoring by a function of the converter
130 Operation in an energy recovery limiting mode
EBM1 First energy recovery limiting mode
EBM2 Second energy recovery limiting mode
f Speed
$M_R$ Regeneration torque
$R_{EC}$ Resistance of a semiconductor switch that is on
$R_{KW}$ Short-circuit resistance of a faulty semiconductor switch
$R_L$ Nonreactive winding resistance
u First phase
v Second phase
w Third phase
$U_p$ Synchronous internal voltage; electromotive force (EMF)
$X_d$ Synchronous reactance

What is claimed is:

1. A converter for an electrical machine, the converter comprising:
    a plurality of phase lines for connecting the electrical machine and the converter; and
    a controller having first and second control elements to respectively determine a malfunction in the converter and thereby initiate a first energy recovery limiting mode or a second energy recovery limiting mode when the malfunction is determined, the first control element having a first plausibility checker which is configured to check outputs from the second control element and determine a presence of a malfunction in the converter and to initiate one of the first energy recovery limiting mode and the second energy recovery limiting mode when a malfunction is detected, and the second control element has a second plausibility checker which is configured to check outputs from the first control element and determine a presence of a malfunction in the converter and to initiate one of the first energy recovery limiting mode and the second energy recovery limiting mode when a malfunction is detected;
    wherein:
        each phase line for the converter has a half-bridge with a plurality of first semiconductor switches and a plurality of second semiconductor switches;
        the first semiconductor switches are to electrically connect at least one of the phase lines intermittently to a first supply line of the converter;
        the second semiconductor switches are to electrically connect the phase line intermittently to a second supply line of the converter;
        the converter is configured for operation intermittently in the first energy recovery limiting mode in which at least two of the first semiconductor switches are at least intermittently on simultaneously; and
        the converter is configured for operation at least intermittently in the second energy recovery limiting mode in which at least two of the second semiconductor switches are at least intermittently on simultaneously.

2. The converter of claim 1, wherein the converter is configured for operation at least intermittently in the first energy recovery limiting mode when the second semiconductor switches are off.

3. The converter of claim 1, wherein the converter is configured for operation at least intermittently in the second energy recovery limiting mode when the first semiconductor switches are off.

4. The converter of claim 1, wherein the converter is configured to adopt one of the first energy recovery limiting mode and the second energy recovery limiting mode when at least one of the control elements is inactive.

5. The converter of claim 1, wherein the converter is configured to adopt one of the first energy recovery limiting mode and the second energy recovery limiting mode when the control elements are inactive.

6. A controller for a converter for an electrical machine, the converter having a plurality of phase lines for connecting the electrical machine and the converter and which is configured for operation intermittently in a first energy recovery limiting mode and a second energy recovery limiting mode, the controller comprising:
   at least one control element including a first control element and a second control element, and which is configured to determine a malfunction in the converter and thereby initiate one of the first energy recovery limiting mode and the second energy recovery limiting mode in the event of a malfunction in the converter, the first control element having a first plausibility checker which is configured to check outputs from the second control element and determine a presence of a malfunction in the converter and to initiate one of the first energy recovery limiting mode and the second energy recovery limiting mode when a malfunction is detected, and the second control element has a second plausibility checker which is configured to check outputs from the first control element and determine a presence of a malfunction in the converter and to initiate one of the first energy recovery limiting mode and the second energy recovery limiting mode when a malfunction is detected,
   wherein:
      each phase line for the converter has a half-bridge with a first semiconductor switch and a second semiconductor switch;
      the first semiconductor switch is configured to electrically connect at least one of the phase lines intermittently to a first supply line of the converter;
      the second semiconductor switch is configured to electrically connect the phase line intermittently to a second supply line of the converter.

7. The controller of claim 6, wherein:
   in the first energy recovery limiting mode, at least two of the first semiconductor switches are at least intermittently on simultaneously; and
   in the second energy recovery limiting mode, at least two of the second semiconductor switches are at least intermittently on simultaneously.

8. The controller of claim 7, wherein the controller is configured to initiate at least one of:
   the first energy recovery limiting mode when one of the first semiconductor switches can no longer be switched off; and
   the second energy recovery limiting mode when one of the second semiconductor switches can no longer be switched off.

9. The controller of claim 7, wherein the controller is configured to initiate at least one of:
   the first energy recovery limiting mode when one of the second semiconductor switches can no longer be switched on; and
   the second energy recovery limiting mode when one of the first semiconductor switches can no longer be switched on.

10. The controller of claim 7, wherein the controller is configured to activate the first energy recovery limiting mode on the basis of at least one of:
    a sensed temperature from an area of at least one of the semiconductor switches;
    a sensed frequency sensor from at least one of the phase lines;
    a sensed temperature from an area of at least one winding of the electric motor of the electric machine; and
    a sensed speed from the electric motor.

11. The controller of claim 7, wherein the controller is configured to activate the second energy recovery limiting mode on the basis of at least one of:
    a sensed temperature from an area of at least one of the semiconductor switches;
    a sensed frequency sensor from at least one of the phase lines;
    a sensed temperature from an area of at least one winding of the electric motor of the electric machine; and
    a sensed speed from the electric motor.

12. The controller of claim 7, wherein the controller is configured to activate the first energy recovery limiting mode and the second energy recovery limiting mode on the basis of at least one of:
    a sensed temperature from an area of at least one of the semiconductor switches;
    a sensed frequency sensor from at least one of the phase lines;
    a sensed temperature from an area of at least one winding of the electric motor of the electric machine; and
    a sensed speed from the electric motor.

13. The controller of claim 7, wherein the controller is configured to activate at least one of the first energy recovery limiting mode and the second energy recovery limiting mode on the basis of at least one of:
    sensed information produced in the converter; and
    sensed information supplied to the converter.

14. The controller of claim 13, wherein the controller is configured to adjust a time ratio for a time component of the activation of the first energy recovery limiting mode to a time component of the activation of the second energy recovery limiting mode.

15. The controller of claim 14, wherein the controller is configured to adjust a time ratio for a time component on the basis of at least one of a temperature distribution between the semiconductor switches and a power distribution between the semiconductor switches.

16. A method for operating a converter of an electrical machine, the method comprising:
    providing a converter comprising a plurality of phase lines for connecting the electrical machine and the converter, wherein for each phase line the converter has a half-bridge with a plurality of first semiconductor switches and a plurality of second semiconductor switches, the first semiconductor switches being configured to electrically connect the phase lines intermittently to a first supply line of the converter, and the second semiconductor switches being configured to electrically connect the phase lines intermittently to a second supply line of the converter;
    monitoring the converter in order to recognize a malfunction in the converter, wherein the monitoring includes which is configured to checking, by a first plausibility checker, outputs from a second control element and determining a presence of a malfunction in the converter, and checking, by a second plausibility checker, outputs from a first control element and determining a presence of a malfunction in the converter; and then
operating the converter, when a malfunction in the converter has been recognized, in one of a first energy recovery limiting mode or a second energy recovery limiting mode in which at least two of the first semiconductor switches are at least intermittently on simultaneously.

* * * * *